United States Patent

[11] 3,560,638

[72] Inventors Ole Skrydstrup
Pierrefonds, Quebec;
John D. Ross, Dollard des Ormeaux,
Quebec, Canada
[21] Appl. No. 722,841
[22] Filed Apr. 22, 1968
[45] Patented Feb. 2, 1971
[73] Assignee Central Dynamics, Ltd.
Montreal, Quebec, Canada
a body corporate

[54] CHROMA KEYING SYSTEM UTILIZING REMOTE CONTROLLED CHROMA KEYER
10 Claims, 6 Drawing Figs.

[52] U.S. Cl. 178/5.4
[51] Int. Cl. H04n 9/04
[50] Field of Search 178/5.2, 5.4, 5.4MC, 5.2A, 5.4Huc, 5.4(6); 250/226; 209/111.6

[56] References Cited
UNITED STATES PATENTS
2,964,589 12/1960 Walker 178/5.4

Primary Examiner—Robert L. Richardson
Attorney—Addams & Ferguson

ABSTRACT: A chroma-keying system is disclosed which utilizes a keying signal source which is responsive to a particular color of interest from a video source. The keying signal source is continuously adjustable so that any color may be selected from the video source. Whenever the selected color exceeds in amplitude a threshold level established at a keying amplifier, the amplifier causes an appropriate output device to be switched from one television camera to another to thereby create a special effects signal at the device. When the keying signal decreases in amplitude below the threshold level of the keying amplifier, the output device is switched back to the original camera. With a single control remotely located from the chroma-keying system (at the operator console, for example), the operator can continually adjust the color of interest from the video source and thus, the special effects signal at the output device can be continuously adjusted, if so desired.

INVENTORS
OLE SKRYDSTRUP
JOHN D. ROSS
BY Addams & Ferguson
ATTORNEYS

INVENTORS
OLE SKRYDSTRUP
JOHN D. ROSS
BY Addams & Ferguson
ATTORNEYS

INVENTORS
OLE SKRYDSTRUP
JOHN D. ROSS
BY Addams & Ferguson
ATTORNEYS

INVENTORS
OLE SKRYDSTRUP
JOHN D. ROSS

BY Addams & Ferguson
ATTORNEY

CHROMA KEYING SYSTEM UTILIZING REMOTE CONTROLLED CHROMA KEYER

BACKGROUND OF THE INVENTION

This invention relates to an improved chroma-keying system and to improved circuitry for use therewith which can be continuously adjusted to select a color of interest from a video source, the selected signal being utilized to actuate the chroma-keying system.

There are commercially available chroma-keying systems, however, the approach employed by these prior art systems does not provide for remote, continuously adjustable control whereby any color may be selected from a video source to st establish the keying signal. Further, to the best of applicant's knowledge, none of the prior art systems provide for a remote control where only the primary or complementary colors are selected to establish the keying signal.

SUMMARY OF THE INVENTION

Thus, a primary purpose of the invention is to provide improved circuitry which is continuously adjustable whereby any color (or only the primary or complementary colors) may be selected from a video source of nonencoded color signals.

A further object of this invention is to provide circuitry of the above type which is remote controllable.

A further object of the invention is to provide circuitry of the above type which is controlled from a remote location by means of DC signals.

A further object of this invention is the provision of an improved chroma-keying system utilizing circuitry of the above type.

A further object of this invention is the provision of a chroma-keying system of the above type which inherently performs (R—Y) and (B—Y) matrixing.

Other objects and advantages of this invention will become apparent upon reading the appended claims in conjunction with the following detailed description and the attached drawing.

BRIEF DESCRIPTION OF THE DRAWING

FIG. 4 is an illustrative circuit diagram of certain components of the embodiment of FIG. 3.

DETAILED DESCRIPTION OF A PREFERRED EMBODIMENT OF THE INVENTION

Figure 1:
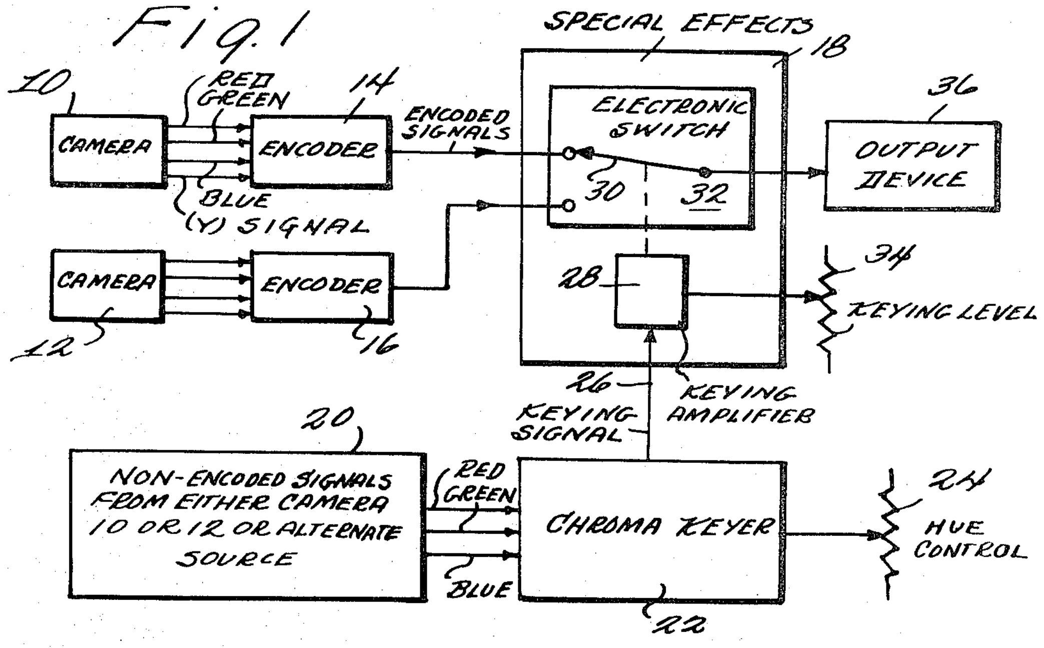
FIG. 1 is a block diagram of an illustrative embodiment of the improved chroma-keying system of the invention.

Referring to FIG. 1 there is shown an overall system in which the present invention is employed. Typically two camera 10 and 12 respectively apply nonencoded red (R), green (G), blue (B), and luminance (Y) signals to encoders 14 and 16. The special effects amplifier 18 selects either camera 10 or 12 depending on the presence of a particular color of interest from a video source 20. As indicated in FIG. 1, source 20 may be either camera 10 or camera 12 or some alternate source not shown. The nonencoded signals from source 20 are applied to chroma-keyer 22, the remote adjustability of which forms a primary aspect of this invention. The "bank pass" of keyer 22 may be continuously adjusted or moved in accordance with the setting of a diagrammatically indicated hue control means such as potentiometer 24, which may be remotely located from the keyer 22 at the operator's console, for example. Thus, if keyer 22 is set by potentiometer 24 to be responsive to the color green, a keying signal will be developed on line 26, the amplitude of which is a function of the amount of green in the signal produced by source 20. A keying amplifier 28 is responsive to the signal on line 26 to control the position of the armature 30 of switch 32, which is preferably electronic in nature. Typically, when the amplitude of the keying signal on line 26 is less than a threshold value established by keying level potentiometer 34, the position of the armature 30 is as shown in FIG. 1 to thereby connect camera 10 to an appropriate output device 36. However, when the amplitude of the keying signal exceeds the threshold value, the armature position is switched to connect camera 12 to the output device. Thus, as a special effects signal is created at device 36, the nature of the special effect being determined in accordance with the presence of a particular color of interest at source 20. As stated above, the particular color is determined by remote control potentiometer 24.

Figure 2:
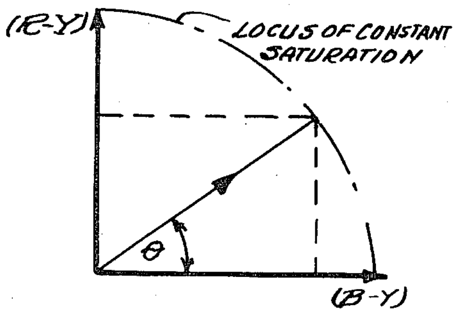
FIG. 2 is a color circle, vector diagram illustrating the theory associated with the improved filter circuit of the invention.

Before discussing in detail the structure and operation of keyer 22, a brief description of the theory associated therewith will be given in order to facilitate understanding thereof. Referring to FIG. 2, there is shown a vector diagram which illustrates the well-known fact that any color may be defined on a color circle in terms of the two color difference vectors (R—Y) and (B—Y) at right angles to each other, these two vectors being derived in standard television signal-transmitting systems. The ratio of the amplitudes of these two vectors defines ¼ and, in turn, the hue of the color such that $$\tan\theta=\left(\frac{R-Y}{B-Y}\right) \qquad (1)$$

Consider the function F (θ) = (R—Y)sinθ0 + (B—Y)cosθ... (2)

then $$\frac{dF(\theta)}{d\theta}=(R-Y)\cos\theta-(B-Y)\sin\theta \qquad (3)$$

thus for F (θ) to reach a maximum $(R-Y)\cos\theta=(B-Y)\sin\theta$ (4)

or $$\tan\theta=\left(\frac{R-Y}{B-Y}\right) \qquad (5)$$

which is the same condition for the definition of a hue. Thus by adjusting θ to correspond to the desired hue, F(θ) or the output of a device having a transfer characteristic of a form corresponding to equation (2), will be a maximum for that particular hue.

Figure 3:
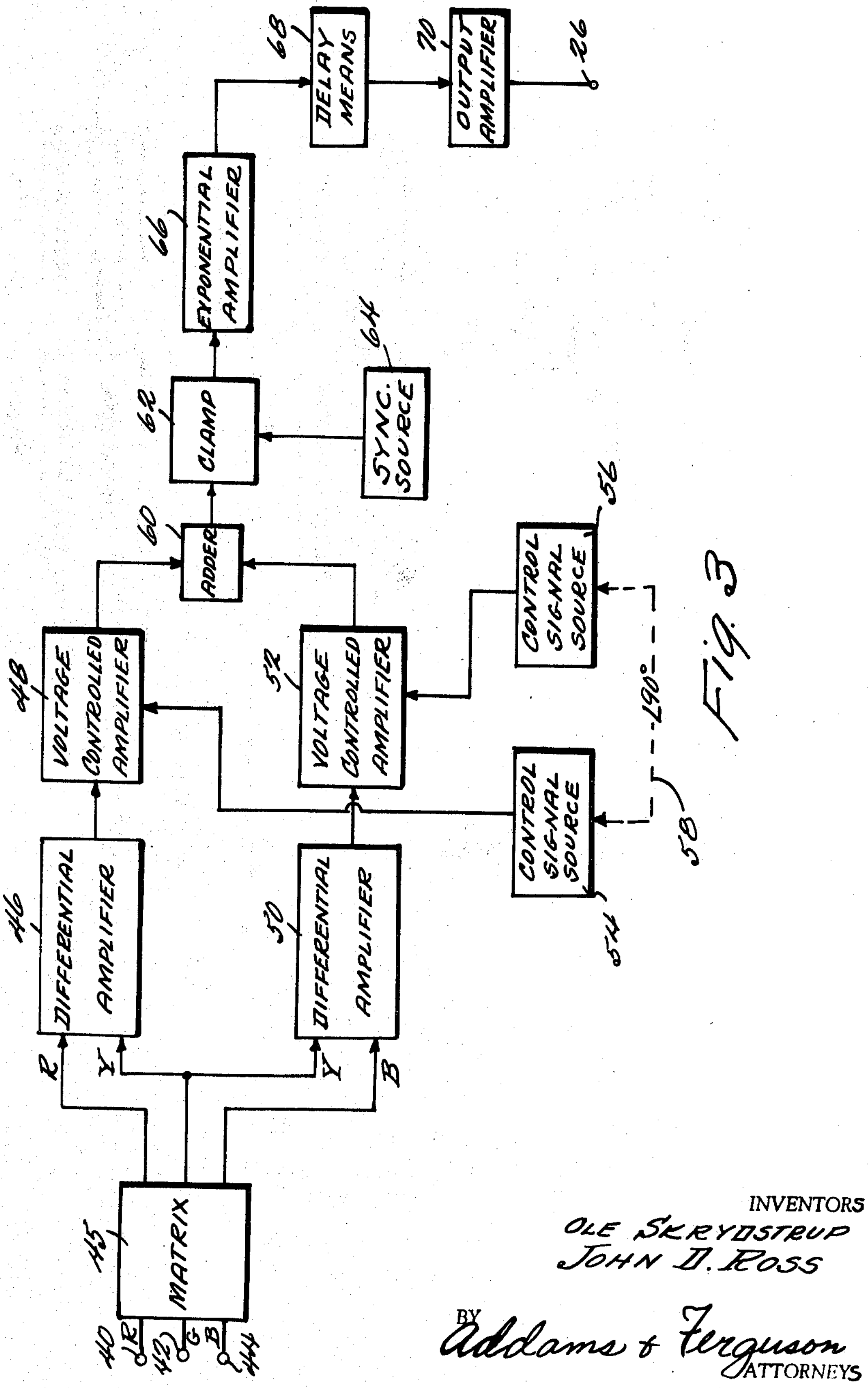
FIG. 3 is a block diagram of an illustrative embodiment of the improved continuously adjustable filter circuit of the invention.
Figure 2:
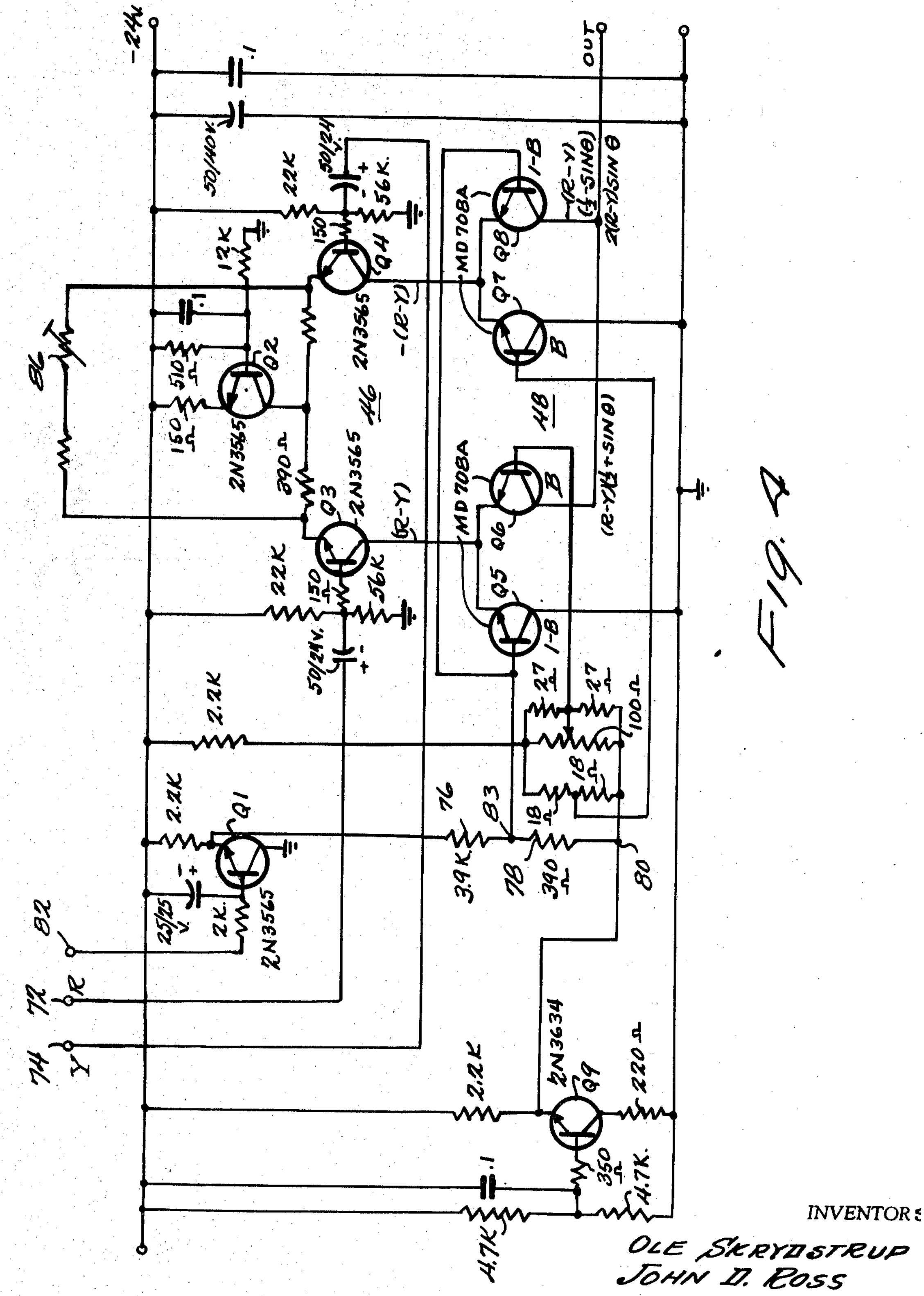

Reference should now be made to FIG. 3 which illustrates in block diagram form the chroma-keyer of FIG. 1 and which also illustrates the implementation of equation (2). Applied at terminals 40, 42 and 44 are the nonencoded signals for source 20 of FIG. 1, these signals are matrixed in a conventional manner at matrix 45 to produce a Y signal. The R and Y signals are then applied to a differential amplifier 46 which forms at least the difference signal (R—Y). The difference signal is the then applied to a voltage controlled amplifier 48 which forms the (R—Y)sinθ signal, which is the first term of the right-hand side of equation (2). The B and Y signals are applied to differential amplifier 50 and the (B—Y)cosθ signal is formed at the output of voltage controlled amplifier 52. The control signals respectively applied to amplifiers 48 and 52 from sources 54 and 56 are 90° out of phase with one another, the sources 54 and 56 being simultaneously controlled by single control means 58 as indicated in FIG. 3. The (R—Y)sinθ and (B—Y)cosθ signals are linearly added in adder 60 to obtain the form indicated by equation (2). A constant reference level is obtained by a clamp circuit 62 which is triggered by a sync signal during the "breeze-away" period. The sync signal is produced by source 64 and it corresponds to the synchronizing pulse utilized in television video signals. The clamped signal is applied to an exponential amplifier 66 to thereby separate the wanted and unwanted sign signals in amplitude. Thus, the amplifier 66 in effect narrows the "pass band" and provides a more definitive keying signal. After the selectivity has been increased by the amplifier 66, the signal is transferred to line 26 (see FIG. 1) via delay means 68 and output amplifier 70. The purpose of delay means 68 is to compensate for the delay which is introduced by the encoder 16 of FIG. 1. Thus, the keying signal on line 26 and the encoder 16 output arrive in time coincidence at the special effects amplifier 18.

Reference should now be made to FIG. 4 which is a circuit diagram of the differential amplifier 46 and the voltage controlled amplifier 48 of FIG. 3. In particular, the differential amplifier includes transistors Q2, Q3, and Q4 and the voltage controlled amplifier includes two voltage controlled variable gain pairs (Q5, Q6 and Q7, Q8). The R and Y signals are applied from matrix 45 from FIG. 3 to terminals 72 and 74 and thence respectively to the bases of transistors Q3 and Q4. As indicated in FIG. 4, out-of-phase difference signals are respectively formed at the collectors of Q3 and Q4. Transistor Q2 acts as a constant current source for the differential amplifier. The control voltage for the variable gain pairs is derived from a potential divider including resistors 76 and 78, the potential divider being disposed between (1) a reference voltage provided at terminal 80 by emitter follower transistor Q9 and (2) a control voltage provided from the emitter follower transistor Q1. The base of transistor Q1 is connected to terminal 82 which in turn is connected to a control unit (described hereinafter with respect to FIG. 6), the operation of which enables an operator to continuously select the desired chroma-keying signal. As can be seen in FIG. 4, illustrative (but not limitative, as is the case for all the FIGS. of the drawing) values are given for the components of the circuit diagram, the resistor values being in ohms and capacitor values being in microfarads unless otherwise specified. With these values, a sinusoidal signal of ±2 volts appears at the base of Q1, which, in turn, appears at the tapping point 82 as ±2 millivolts. The gain controlled pairs (Q5, Q6 and Q7, Q8) each comprise a current source (Q5 and Q8) which drives a grounded base stage (Q6 and Q7). The gain of each side of a pair being determined by the control voltage in the ratio of B to 1—B, where B is a function of the control voltage. Thus, the gains of Q5 through Q8 are as respectively indicated in FIG. 4. B is a function of the form ($\frac{1}{2}$+sin$\theta$). Thus, the collector outputs from Q6 and Q8 are as indicated in FIG. 4. These two outputs are combined in a grounded base stage (see FIG. 6), the combined result being indicated at terminal 84 for purposes of illustration. The result is 2 (R—Y)sin$\theta$which corresponds to the first term of equation (2). The (B—Y)cos$\theta$f unction is derived in an identical manner in differential amplifier 50 and voltage controlled amplifier 52, the only difference being that the phase of the control voltage from source 56 (see FIG. 1) is 90°in advance of that applied from source 54. A gain control indicated at 86 in FIG. 4 is provided only with respect to differential amplifier 46 (not amplifier 48) whereby the (R—Y) vector can be adjusted to give equal maxima for each saturated color. In other words, the amplitude of a saturated green hue occurring at the output of adder 60 of FIG. 3 will not necessarily be of the same amplitude as that of a saturated red hue occurring in the adder 60 output. Adjustment of a variable resistor 86 provides the necessary compensation.

Figure 5:
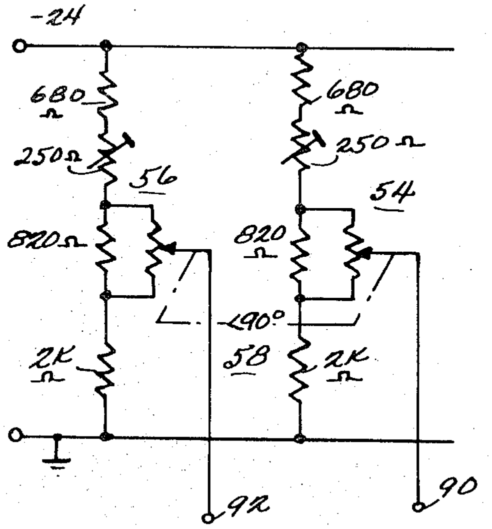
FIG. 5 is an illustrative circuit diagram of further of the components of FIG. 3.

Reference should now be made to FIG. 5 which is a schematic diagram of the remote control source indicated at 54 through 58 in FIG. 3. As can be seen, the elements 54 through 58 of FIG. 1 preferably include a ganged sine/cosine potentiometer, the details of which are well known to those of ordinary skill in this art. Thus, terminal 90 is connected to terminal 82 of FIG. 4 while terminal 92 is connected in a corresponding manner to voltage controlled amplifier 52 of FIG. 3.

Figure 6:
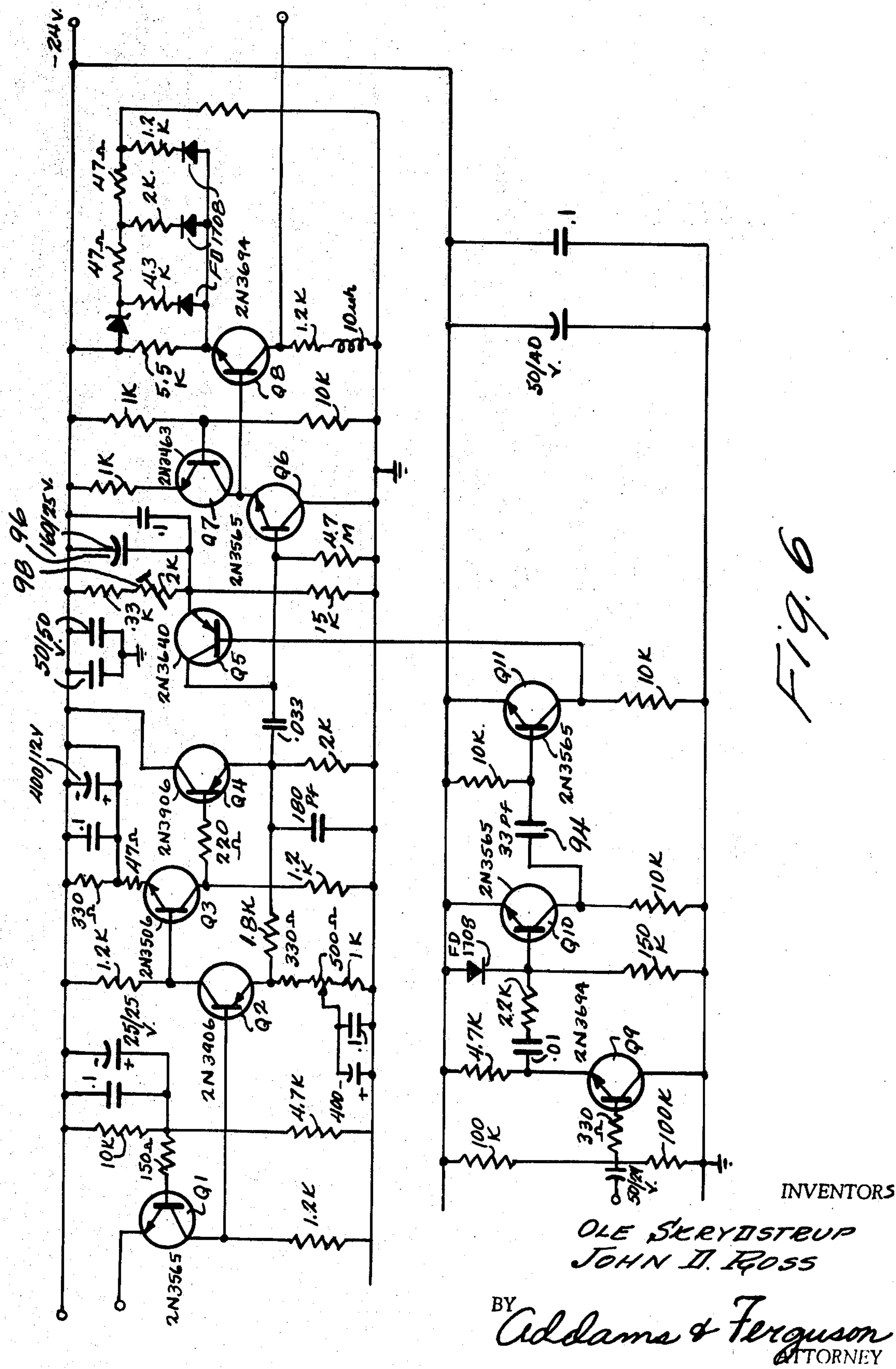
FIG. 6 is an illustrative circuit diagram of further components of FIG. 3.

Reference should now be made to FIG. 6 which is a schematic diagram of the circuitry corresponding to the adder 60, clamp 62, and exponential amplifier 66 of FIG. 3. The outputs from the voltage controlled amplifiers 48 and 52 are linearly added in a grounded base stage Q1, which corresponds to adder 60. This stage is followed by a three-stage direct coupled amplifier (Q2, Q3, and Q4) with a typical overall gain of 15 to 18 dbs, negative feedback being applied to the emitter of Q2 from Q4. A gain control is included in this amplifier to allow a signal input voltage of anything between 0.7 and 1.0 volts p/p to be used. The low impedance output of Q4 is used to feed the clamp circuit.

Sync signals are applied to Q10 via an emitter follower Q9 from the source 64 of FIG. 3. Q10 is normally biased into saturation, but the negative sync pulse turns it off, producing a +24 volt sync pulse at the collector. This pulse is differentiated by a coupling capacitor 94, the discharge path in the case of the leading edge positive transient, being chiefly through Q11. This transient spike drives Q11 hard on, dropping its collector voltage to line. This in turn saturates the clamp transistor Q5, which defines the collector at the clamp voltage, maintained at the emitter by capacitor 96. This voltage may be adjusted within certain limits by variable resistor 98 in the voltage divider network.

Q6 and Q7 form effectively an emitter follower with an infinite input impedance, Q7 being a constant current source. The output is direct coupled into the stretch amplifier. The transfer characteristic of the stretch amplifier is a piecewise linear approximation to an exponential. The gain is basically defined by the ratio of the effective emitter and collector impedances. The zener diode maintains the base of a voltage divider chain at the clamp voltage and provides an AC short circuit to earth. The biasing is adjusted so that the diodes come into conduction at 0.5 volt intervals putting a smaller resistance in parallel with the emitter resistance as the signal voltage increases, thus increasing the gain.

The output from the exponential amplifier is connected from the delay means 68 of FIG. 3 as described hereinbefore. Preferably delay means 68 includes a delay line having typically three fixed delays which may be switched in and out together with a variable delay. The delay line output is connected to the amplifier 70 of FIG. 3 as described hereinbefore.

Thus, there has now been described the structure and operation of a preferred embodiment of the invention. It can be seen that the chroma-keyer 22 is effectively a narrow bank chromatic "filter" whose "pass band" may be positioned anywhere in the color spectra by remote control, that is, the positioning of a single control on the operating console enables one to select the signal component of any desired color in a monitored picture.

Numerous modifications of the invention will become apparent to one of ordinary skill in the art upon reading the foregoing disclosure. During such a reading it will be evident that this invention provides an a unique chroma-keying system for accomplishing the objects and advantages herein stated. Still other objects and advantages and even further modifications will become apparent from this disclosure. It is to be understood, however, that foregoing disclosure is to be considered exemplary and not limitative, the scope of the invention being defined by the following claims.

We claim:

1. Circuitry responsive to a color television camera or other similar source which produces at least three nonencoded color signals such as red (R), green (G), and blue (B) signals, said circuitry selecting any desired color signal from said source and comprising:

- matrix means responsive to said red, green, and blue signals to produce red, blue, and luminance signals;
- means for developing at least two control signals, which are respectively 90°out-of-phase with one another;
- filter means responsive to said red, blue, and luminance signals and said two control signals for producing a signal having the form (R—Y) sin $\theta$+ (B—Y) cos $\theta$ where $\theta$ is a function of said control means and corresponds to said desired color; and
- whereby said filter means causes the desired color signal to be maximized with respect to other color signals and thus, the filter means acts as a chromatic filter, the "pass band" of which may be positioned anywhere in the color spectra by said control means.

2. Circuitry as in claim 1 including exponential amplifier means for increasing the selectivity of said filter means by further increasing the amplitude of said desired color signal with respect to said other color signals.

3. Circuitry as in claim 1 where said control means is remotely located from said filter means.

4. Circuitry as in claim 1 where said filter means includes:

at least two differential amplifiers, the first of which is responsive to said red and luminance signals to form at least the difference signal (R—Y), and the second of which is responsive to said blue and luminance signals to form at least the difference signal (B—Y);

and a pair of voltage controlled amplifiers respectively responsive to said differential amplifiers, the first of which is responsive to (1) the (R—Y) difference signal and (2) the first of said two control signals to form a (R—Y) sin $\theta$function and the second of which is responsive to (1) the (B—Y) difference signal and (2) the second of said two control signals to form a (B—Y) cos $\theta$ function; and means for combining said last two mentioned functions to form said (R—Y) sin $\theta$+ (B—Y) cos $\theta$ signal.

5. Circuitry as in claim 4 where said control means includes a ganged sine/cosine potentiometer.

6. A chroma-keying system for providing a special effects signal in accordance with the presence of a desired color from a color television camera or other similar source which produces at least three nonencoded color signals such as red (R), green (G), and blue (B) signals, said system comprising:

at least two video signal sources each producing nonencoded signals such as red (R), green (G), blue (B) and luminance (Y) signals;

at least two encoder means respectively responsive to said two video signal sources, each encoder means producing encoded video signals;

a multiposition electronic switch having at least two stable positions respectively corresponding to said two encoders;

output means responsive to said switch, said switch connecting one or the other of said two video signal sources to said output device depending on the position of said switch to thereby create at said output device special effects;

keying means for controlling the position of said switch, said keying mean, having a threshold level associated therewith;

adjustable filter means responsive to said source of nonencoded color signals for developing a keying input signal which corresponds to said desired color, said keying signal being applied to said keying means and causing said switch to change from one of its stable positions to the other whenever said keying signal crosses the threshold value of said keying means; and control means for adjusting said filter means so that said desired color may be selected.

7. A system as in claim 6 where said control means includes means for developing at least two control signals, which are respectively 90°out-of-phase with one another, and where said filter means includes:

matrix means responsive to said red, green, and blue signals from said source of nonencoded color signals to produce red, blue, and luminance signals;

means responsive to (1) said last-mentioned red, blue, and luminance color signals and (2) said two control signals for producing a signal having the form (R—Y) sin $\theta$+ (B—Y) cos $\theta$ where $\theta$ is a function of said control means and corresponds to said desired color; and whereby said filter means causes the desired color signal to be maximized with respect to other color signals and thus, the filter means acts as a chromatic filter, the "pass band" of which may be positioned anywhere in the color spectra by said control means.

8. Circuitry as in claim 7 including exponential amplifier means for increasing the selectivity of said filter means by further increasing the amplitude of said desired color signal with respect to said other color signals.

9. Circuitry as in claim 7 where said filter means includes:

at least two differential amplifiers, the first of which is responsive to said red and luminance signals to form at least the difference signal (R—Y), and the second of which is responsive to said blue and luminance signals to form at least the difference signal B—Y);

and a pair of voltage controlled amplifiers respectively responsive to said differential amplifiers, the first of which is responsive to (1) the (R—Y) difference signal and (2) the first of said two control signals to form a (R—Y) sin $\theta$function and the second of which is responsive to (1) the (B—Y) difference signal and (2) the second of said two control signals to form a (B—Y) cos $\theta$ function; and means for combining said last two mentioned functions to form said (R—Y) sin $\theta$+ (B—Y) cos $\theta$ signal.

10. Circuitry as in claim 6 where said control means is remotely located from said filter means.